Patented May 13, 1947

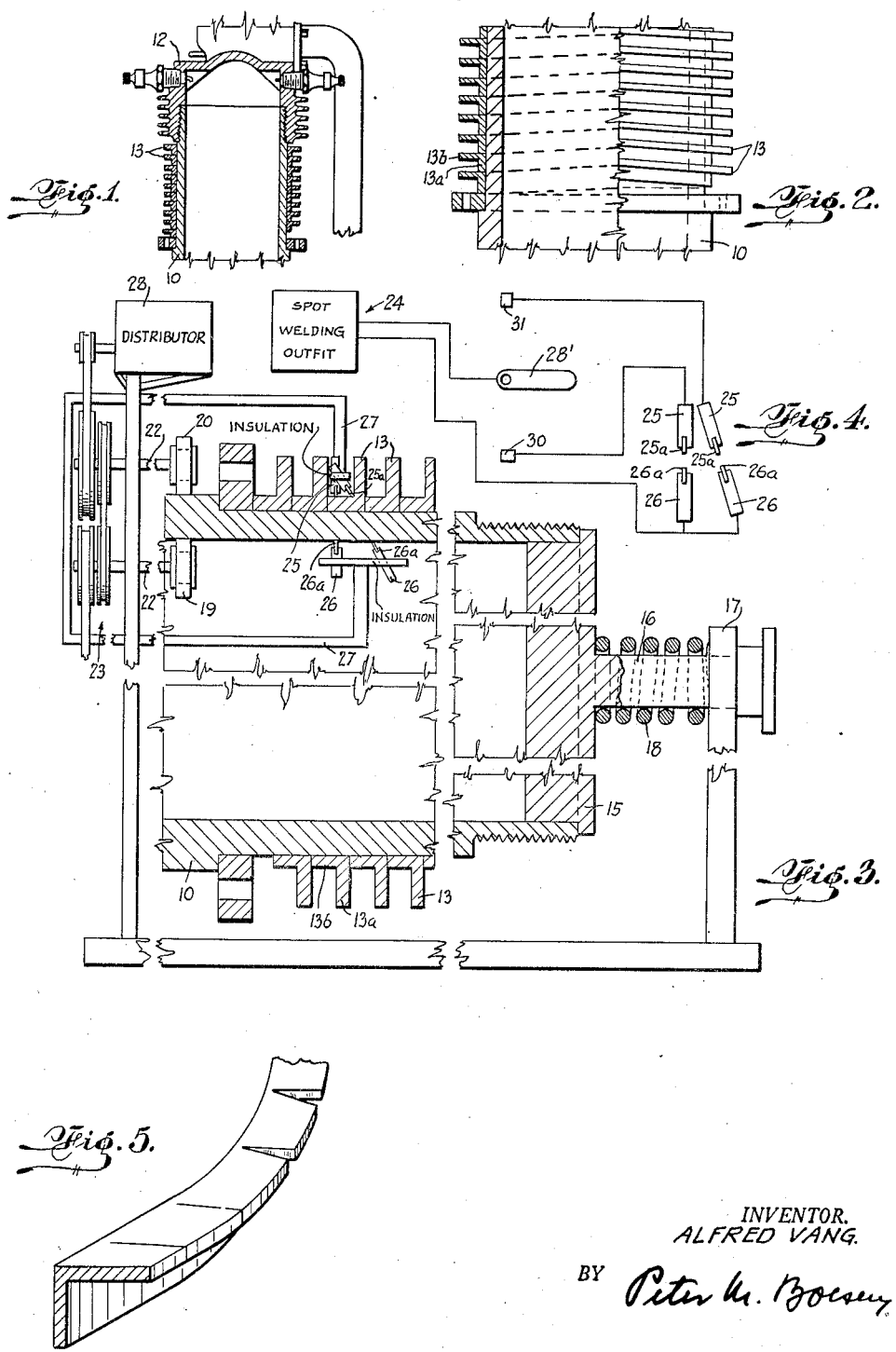

2,420,332

UNITED STATES PATENT OFFICE 2,420,332

MEANS FOR CONSTRUCTING AIR-COOLED CYLINDERS

Alfred Vang, New York, N. Y.

Application December 11, 1943, Serial No. 513,885

4 Claims. (Cl. 219—4)

1

This invention is a continuation-in-part of the one embodied in my application for patent, filed April 2, 1943, under Serial No. 481,722, now Patent No. 2,396,216, dated March 5, 1946, and related to new and useful improvements in means for constructing air-cooled cylinders for engines, refrigerator systems, heating systems, and other purposes. Thus, it may in like manner be applicable to any hollow object to which it is desired to impart the characteristics of my invention.

More particularly this invention refers to the apparatus, by means of which the construction herein set forth is accomplished.

Fundamentally this construction of an air-cooled cylinder consists in closely spot welding a fin material of great thermal conductivity directly upon the steel cylinders of the engine. Preferably, this fin material will be aluminum, as this material has a great conductivity constant at high temperatures. Other materials may also be used, such as copper. At relatively lower temperatures copper is a better conductor of heat, but at the high temperatures proposed for the improved engine, aluminum will be ideal.

The invention contemplates a novel means for carrying out my ideas, which is characterized by a spot welding outfit, having a gang of electrodes adapted to be located inside and outside of the wall area of a cylinder, and associated means with the cylinder and the electrodes for feeding the fin material and simultaneously turning the cylinder and closely spot welding the fin material on to the latter.

It is to be understood that, while my invention has been described herein as preferably pertaining to air-cooled cylinders for engines, it is well within the scope of the invention to use water or any other suitable medium as a cooling agent.

In the following description of the invention like numerals indicate similar parts throughout the drawing, in which:

Figure 1 is a sectional view of one of the cylinders of an air-cooled engine, embodying this invention.

Figure 2 is a fragmentary enlarged detailed view of a portion of Figure 1, but with a front portion of the cylinder being illustrated.

Figure 3 is a sectional view of the cylinder shown in Figures 1 and 2, but illustrated in conjunction with means for constructing the cylinder with the fins, in accordance with this invention.

Figure 4 is a schematic view of the welding outfit used in this invention, while Figure 5 is a sectional view of a modified form of the fin material.

In Figure 1, reference numeral 10 indicates generally the steel cylinder of an internal combustion engine. This cylinder is shown provided with a cylinder head 12. The cylinder is also provided with fins 13 for assisting in radiating the heat of combustion. The invention relates to the application of these fins 13.

In Figure 2 a detail is disclosed of the fins 13. It should be noted that they are formed from a strip of material wound helically on the cylinder 10. This strip of material is substantially of an L-shape or slotted L-shape, in transverse cross section, so as to have an arm portion 13a which engages against the outside diameter of the cylinder 10 and a radially projecting arm portion 13b, from which the heat radiates freely. The invention particularly proposes that the fins 13 be made of aluminum or other material of great thermal conductivity. The invention relates to the welding of the fin material 13 to the steel cylinder 10.

In order to facilitate the attachment of the strip of fin material, some of which may show some resistance to the winding or "curling" process, the L portion of said material may be slotted, as shown in Figure 5, thereby obtaining also, a greater number of heat radiating members.

In Figures 3 and 4 a detail has been shown of the means for welding the fin material in position. The cylinder 10 is rotatively supported by an end disc 15, which is engaged in one end thereof. This end disc is mounted on a shaft 16, rotatively supported in a standard 17. A spring 18 urges the disc 15 into the end of the cylinder 10.

A pair of friction rollers 19 and 20 frictionally engage opposite points upon one side of the cylinder 10. Specifically, the friction rollers 19 and 20 are located inside and outside of the cylinder 10. These rollers are mounted on the shafts 22 of a drive system 23, which is designed so that the cylinder 10 will be slowly turned.

A spot welding outfit 24, having a gang of electrodes 25 and 26 located inside and outside of a wall area of the cylinder 10, is arranged to closely spot weld the fin material 13 to the cylinder. The electrodes 25 and 26 have contact rollers 25a and 26a for engaging the work, and are supported by a support frame 27. This support frame 27 is of resilient material, so that the electrodes 25 and 26 may be properly pressed against the work being welded. The electrodes 25 and 26 are connected up with a distributor 28, which is driven by the drive means 23, so as to work simultaneously with the turning of the cylinder 10. The distributor 28 has a rotating arm 28', which engages the contacts 30 and 31 in succession to close the electrical circuit to the individual electrodes of the gang of electrodes, so that they work one pair at a time. The details of the spot welding outfit will not be given in this specification as it forms no part of the invention and any type of outfit may be used. The type recommended would be like that disclosed in my invention covered by the U. S. Patent No. 2,287,544, issued June 23, 1942, and entitled "Electric welding of metals and the uniting of dissimilar metals."

The operation of the device is as follows:

The fin material 13 may be drawn off from a supply spool or supplied in any other desirable way. It is helically wound on the cylinder 10 in the manner illustrated in Figures 2 and 3. It may be closely spot welded as it is helically wound on the cylinder, or it may be subsequently spot welded after it has been placed in position.

The spot welding operation must be carried out as follows: The gang of electrodes 25 and 26 is started at one end of the fin material 13. The cylinder 10 slowly rotates and the gang of electrodes move longitudinally along the helical formation. During this motion the electrodes individually spot weld points of the fin material and the cylinder. These points must be very closely spaced together. In fact, they must be so closely spaced that they overlap. This welding operation may be carried on in one operation, or the spot welding may be carried on in more than one operation. When the latter system is used the spot welding initially is not spaced so closely, but then a second series of spot welding is done in between the points of the first group of spot weldings. In this way the fin material 13 is closely spot welded, in fact, so closely spot welded that it is substantially 100% welded to the cylinder 10.

It is pointed out that the fin material 13 is directly welded to the cylinder 10. There is no intermediate third material to form a binder between them. As pointed out in my prior patent, the spot welding operation breaks through the film on the contacting surfaces of the materials being spot welded. Thus the objectionable film which hinders the conduction of heat is broken up, and the molecules of the fin material will be in molecular contact with the molecules of the cylinder. When this is so, there will be free conduction of heat from the cylinder 10 to the fins 13.

It will be found that the thermal efficiency of the radiating system of the cylinder when constructed in accordance with this invention will be some 27% higher than with the past prior construction. Because of this, the engine may be designed to produce more horsepower per unit of weight. The advantages of this have already been discussed in the object portion of this specification.

It is obvious that slight changes may be made in the form, construction, and arrangement of the several parts, as shown, within the scope of the appended claims, without departing from the spirit of my invention, and I do not therefore, wish to limit myself to the exact construction and arrangement shown and described herein.

Having thus described my invention, what I claim as new and desire to secure by United States Letters Patent is:

1. A device for welding fins from strip material of L cross section helically wound on a cylinder to the latter; said device comprising means for supporting and rotating the cylinder and substantially preventing longitudinal movement of the cylinder, and an electrode mounted to move substantially longitudinal of the cylinder and to engage against the sides of the fin and the base thereof, whereby on rotation of the cylinder and fin the electrode is longitudinally fed along the cylinder by the fin in a screw-like manner.

2. A machine for welding angle metal fin material, helically disposed on an engine cylinder, to the latter; said machine comprising head and tail supporting standards adapted to receive the cylinder therebetween, means on the tail standard for rotatably mounting the tail end of the cylinder, a pair of electrodes adapted to engage the interior wall and the fin respectively, a source of current connected to the electrodes, inner and outer drive shafts rotatably mounted on said head standard in the same plane with and parallel to the axis of the cylinder, and inner and outer friction wheels remote from the electrode and source and mounted on said drive shafts and in the same plane, and adapted to engage adjacently the inner and outer walls of one end of the cylinder.

3. A machine for welding angle metal fin material, helically disposed on an engine cylinder, to the cylinder; said machine comprising substantially parallel head and tail supporting standards, adapted to receive the cylinder therebetween, means for rotatably mounting the tail end of the cylinder, a resilient support frame having an inner end adapted to be received in the hollow of the cylinder and an outer end adapted to be disposed exterior of the cylinder and opposite the inner end of said frame, a pair of electrodes mounted on said ends and adapted to engage the cylinder and fin, respectively, inner and outer drive shafts rotatably mounted on said head standard in the same plane with and parallel to the axis of the cylinder, and inner and outer friction wheels remote from the electrode and source and mounted on said drive shafts and in the same plane, and adapted to engage adjacently the inner and outer walls of the head end of the cylinder.

4. A machine for welding angle metal fin material, helically disposed on an engine cylinder, to the cylinder; said machine comprising substantially parallel head and tail supporting standards adapted to receive the cylinder therebetween, a tail shaft rotatably mounted on the tail standard and projecting inwardly, a disk on the inner end of the tail shaft in axial alinement therewith and adapted to be received in one end of the cylinder, whereby the cylinder disk and shaft may rotate about a common axis, a resilient support frame having an inner end adapted to be received in the hollow of the cylinder and an outer end adapted to be disposed exterior to the cylinder and opposite the inner end of the frame, a pair of electrodes mounted on said ends and adapted to engage the cylinder and fin respectively, a source of current connected to the electrodes, inner and outer drive shafts rotatably mounted on said head standard in the same plane, with and parallel to the axis of the cylinder, and inner and outer friction wheels remote from the electrode and source and mounted on said drive shafts and in the same plane and adapted to engage adjacently the inner and outer walls of one end of the cylinder.

ALFRED VANG.

REFERENCES CITED

The following references are of record in the file of this patent:

UNITED STATES PATENTS

| Number | Name | Date |
| --- | --- | --- |
| 1,315,239 | Pierce et al. | Sept. 9, 1919 |
| 1,601,927 | Tobey (1) | Oct. 5, 1926 |
| 1,601,928 | Tobey (2) | Oct. 5, 1926 |
| 2,174,928 | Riemenschneider | Oct. 3, 1939 |
| 1,601,929 | Tobey (3) | Oct. 5, 1926 |
| 1,875,483 | Naylor | Sept. 6, 1932 |
| 2,344,790 | Schryber | Mar. 21, 1944 |
| 246,820 | Robbins | Sept. 6, 1881 |